United States Patent [19]

Pascouet

[11] 4,303,141
[45] Dec. 1, 1981

[54] LIQUID SLUG PROJECTOR APPARATUS

[76] Inventor: Adrien P. Pascouet, 9 Bis rue Jean Mallard, 83100 Toulon, France

[21] Appl. No.: 144,686

[22] Filed: Apr. 28, 1980

Related U.S. Application Data

[63] Continuation-in-part of Ser. No. 7,122, Jan. 26, 1979, abandoned, which is a continuation-in-part of Ser. No. 884,441, Mar. 7, 1978, abandoned.

[51] Int. Cl.³ .................... G01V 1/137; G01V 1/138
[52] U.S. Cl. .................. 181/120; 367/146; 181/115
[58] Field of Search ............ 181/106, 110, 115, 118, 181/119, 120; 367/146

[56] References Cited

U.S. PATENT DOCUMENTS

| | | | |
|---|---|---|---|
| 3,403,374 | 9/1968 | Meller et al. | 181/120 |
| 4,131,178 | 12/1978 | Banyancos | 181/120 |
| 4,185,714 | 1/1980 | Pascouet et al. | 181/120 |
| 4,203,501 | 5/1980 | Chalet et al. | 181/120 |
| 4,211,300 | 7/1980 | Miller | 181/120 |

FOREIGN PATENT DOCUMENTS

| | | | |
|---|---|---|---|
| 69264 | 11/1976 | Australia | 181/120 |
| 2307999 | 11/1976 | France | 181/120 |
| 2308112 | 11/1976 | France | 181/120 |

OTHER PUBLICATIONS

Renard et al., "Simple Water Gun . . .", 1974, 5 pp., Offshore Technology Conf. VI, vol. 1.
Anedih et al., "New High Energy Implosion Seismic Source", 7/73, pp. 42–43, Ocean Industry.

*Primary Examiner*—Nelson Moskowitz
*Attorney, Agent, or Firm*—Michael P. Breston

[57] ABSTRACT

The liquid slug projector apparatus (9) comprises a generator (10) having a main housing (13) whose main port (17b) fluidly communicates with a liquid body (12). A first shuttle (26) and a second shuttle (61a) are slidably mounted inside the main housing. The first shuttle forms with the main housing a slug chamber (23) for confining therein a liquid slug (22). Force-producing means (8) cyclically cause the shuttles (26, 61a) to move relative to or in locked condition with each other, thereby applying during each cycle of operation an abrupt propulsion force to the confined liquid slug which becomes expelled as a very high-velocity liquid jet (22a) through the main port.

10 Claims, 8 Drawing Figures

LIQUID SLUG PROJECTOR APPARATUS

CROSS-REFERENCE TO RELATED APPLICATIONS

This application is a continuation-in-part of copending application Ser. No. 007,122, filed on Jan. 26, 1979, now abandoned, which is a continuation-in-part of application Ser. No. 884,441, filed on Mar. 7, 1978 and now abandoned.

BACKGROUND OF THE INVENTION

1. Field of the Invention

This invention relates to an apparatus for producing in a body of water acoustic impulses which are useful, for example, for seismic exploration.

2. Description of the Prior Art

Generators with pistons for producing in water acoustic impulses are known—see, for example, U.S. Pat. Nos. 3,369,627, 3,642,090, 3,642,089, 3,711,824, 4,131,178, 4,185,714 and French Pat. Nos. 2,307,999 and 2,308,112.

Pneumatically-operated, air-releasing generators (known as "air guns") for producing acoustic pulses in water are also known. Such known air guns are too heavy and bulky. They waste a considerable amount of energy of releasing compressed air into the water.

In U.S. Pat. No. 4,185,714 is described an acoustic generator for producing acoustic impulses by injecting a liquid jet into a liquid body. The generator includes a main housing having a first bore, a bottom stop wall having a main port, and a top stop wall having a top port. The generator has a single shuttle made up of a main piston, an auxiliary piston, and an interconnecting push rod. The main piston is slidably mounted in the first bore which defines, in use of the generator, a slug chamber between the bottom stop wall and the main piston. A liquid slug is confined in the slug chamber. A vent chamber is formed between the main piston and the top stop wall.

The second piston is slidably mounted in a second bore which also provides a return chamber between the second piston and a fixed seal ring which slidably receives the push rod. A trigger chamber, between the second piston and the housing, has a vent and a pressure inlet. A reservoir chamber has a pressure inlet and a pressure outlet. The return chamber has a pressure inlet. The vent chamber has a vent hole.

A normally-closed, mechanically-operated valve couples an air pressure source to the inlet of the reservoir chamber. The return chamber is directly coupled to the air pressure source. A normally-closed, electrically-operated valve couples the outlet from the reservoir chamber to the inlet of the trigger chamber. A plunger is movably mounted in a wall of the housing above the trigger chamber.

In use of the generator, the plunger becomes displaced by the auxiliary piston when it reaches its uppermost position in the second bore, thereby opening the mechanically-operated valve which admits air pressure to the reservoir chamber.

The electrically-operated valve admits air pressure from the reservoir chamber to the trigger chamber, thereby causing the shuttle to execute a forward stroke which expels the liquid slug from the slug chamber. The liquid slug forms a liquid jet that is abruptly injected through the generator's main port into the surrounding liquid body. In response to the air pressure in the return chamber, the shuttle executes a return stroke, and the cycle is repeated.

In this known seismic generator, ambient air is first compressed by the compressor and the resulting increase in gas temperature involves a loss of energy in heat exchanges between the medium outside of the generator and the compressor. Also, the compressed gas released into the ambient represents a considerable loss of energy and may even create undesirable noise.

SUMMARY OF THE INVENTION

The liquid slug projector apparatus comprises a housing having a bottom stop wall which defines a main port adapted to be submerged in a liquid body. A first shuttle and a second shuttle are slidably mounted inside the housing. A slug chamber between the bottom stop wall and the first shuttle confines a liquid slug. Force-producing means cyclically cause the shuttles to move relative to or in locked condition with each other, thereby applying during each cycle an abrupt propulsion force to the confined liquid slug which becomes expelled as a very high-velocity liquid jet through the main port.

The force-producing means maintain the locked shuttles in ready-to-be-fired condition. The apparatus is programmed so that the force-producing means abruptly release the first shuttle from the second shuttle, propel the first shuttle toward the bottom stop wall thereby ejecting the liquid slug, move and then lock the second shuttle with the first shuttle, and return the locked shuttles to complete one cycle of operation.

In the preferred embodiment of the apparatus, the maintaining and shifting of the shuttles are accomplished pneumatically except that moving the second shuttle toward and locking it to the first shuttle is done hydraulically.

In accordance with an important aspect of the invention, the amount of energy which is needed and must be supplied to the acoustic apparatus between two consecutive cycles of operation has been substantially reduced. Accordingly, the present invention makes it possible to build a relatively-small, lightweight and economical acoustic apparatus of the foregoing type.

DETAILED DESCRIPTION OF PREFERRED EMBODIMENTS

Figure 1:
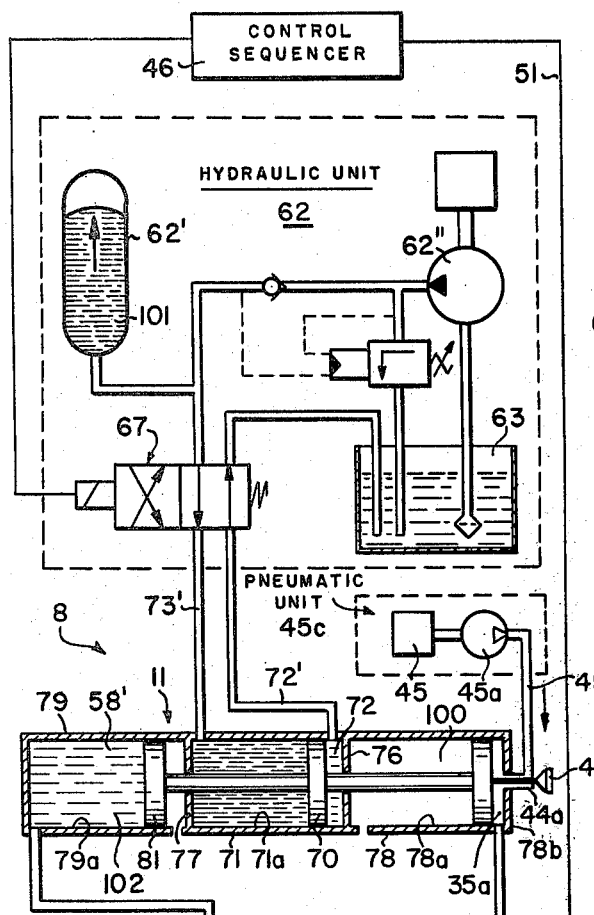
FIG. 1 shows a sectional view in elevation of a preferred embodiment of the acoustic apparatus; the main shuttle of the generator is shown in its ready-to-be-fired position.

The apparatus 9 of this invention includes a generator 10 which is operated by a distributor 11. Generator 10 produces acoustic impulses within a surrounding liquid body 12 by expelling a liquid slug 22 at a very high velocity in the form of a liquid jet 22a. Generator 10 has a cylindrical housing 13 which defines a first bore 16 and a second, larger-diameter bore 66a. Housing 13 has a top stop wall 68 and a bottom stop wall 17. Wall 17 defines a main port 17b which, in use, in submerged in the liquid 12, and wall 68 defines a top port 68'. Inside bores 16 and 66a are slidably mounted a first shuttle 26 and a second shuttle 61a.

Force-producing means 8 cyclically operate on the first and second shuttles and make them move together or relative to each other, as will be subsequently described. In the preferred embodiment, the force-producing means 8 are: compressed air 100, obtained from a pneumatic unit 45c, and a hydraulic fluid 102 contained within chambers 58, 58' and an interconnecting conduit 58a.

Shuttle 26 comprises a first main piston 20, slidably mounted in bore 16 on a seal ring 21, a second piston 27, and an interconnecting push rod 26a. Shuttle 61a comprises a third piston 60 having a port 18b, a fourth piston 61, and an interconnecting push rod 61b havng a third bore 29. Piston 27 is slidably and sealingly mounted inside bore 29. Piston 61 is slidably and sealingly mounted inside bore 66a. Piston 60 is slidably and sealingly mounted inside bore 16.

Bore 16 defines a slug chamber 23 between wall 17 and piston 20. A main reservoir chamber 35 is defined between pistons 60, 61 and housing 13. Bore 29, chamber 35, and port 18b are in fluid communication. Wall 17 and piston 60 define piston seats 17a and 18a, respectively. Seats 17a and 18a have beveled surfaces, and piston 20 has matching, tapered surfaces 20a and 20b, respectively. Wall 17 acts as a stop for piston 20 which, in turn, acts as a stop for piston 60.

Inside bore 29 and above piston 27 is a trigger chamber 31 which vents outside of generator 10 through a vent 33. Chambers 31 and 35 are fluidly interconnected through a solenoid-operated valve 50 mounted inside a sleeve 15 above piston 61. Valve 50 controls a passageway 49 which interconnects chambers 31 and 35. Sleeve 15 forms integral part with piston 61 and is sealingly and slidably mounted inside port 68'.

Figure 3:
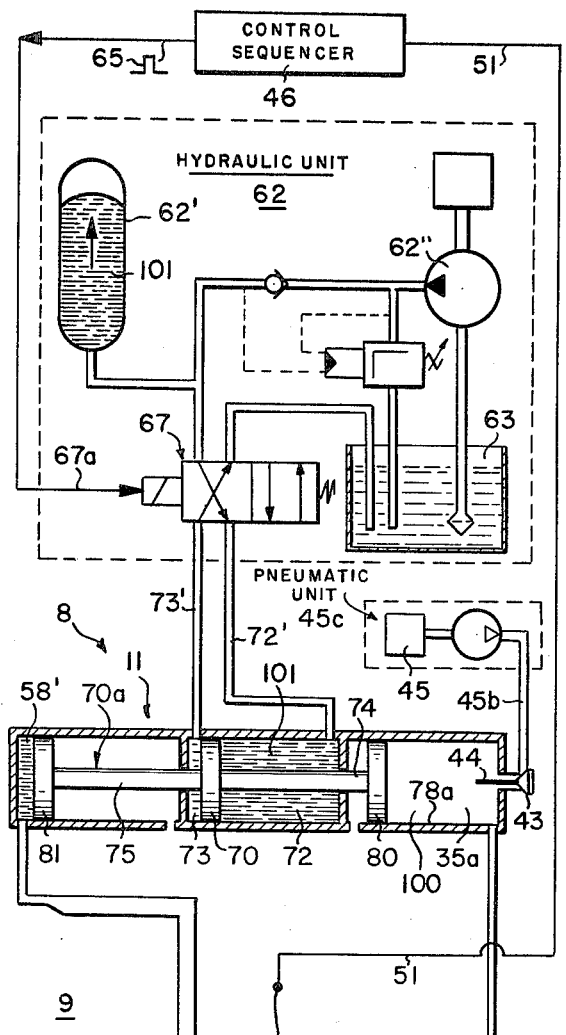
FIG. 3 shows the end of the forward strokes of the second and third shuttles.
Figure 3:
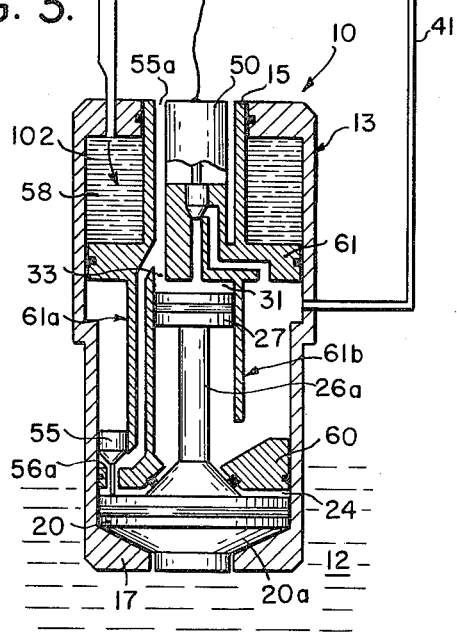
Figure 4:
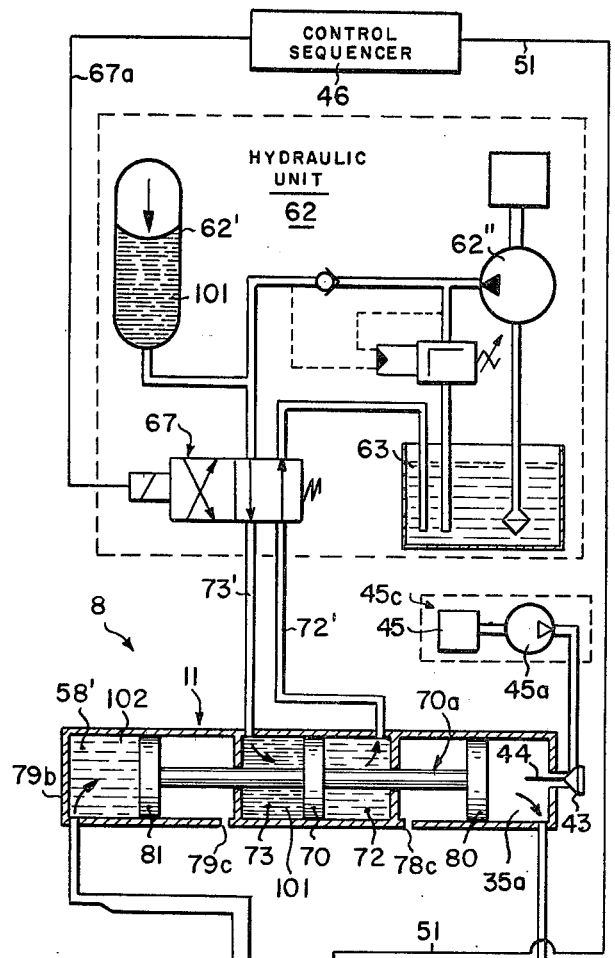
FIG. 4 shows the return stroke of the first and second shuttles hooked together.
Figure 4:
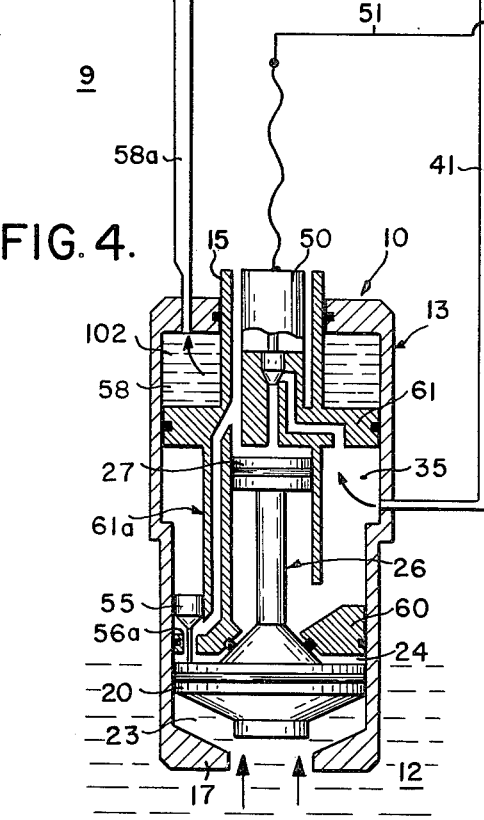

Housing 13 has a vent chamber 24 between pistons 20 and 60. When chamber 24 is reduced to its smallest volume, as shown in FIGS. 1, 3 and 4, it will vent to the outside through a normally-closed valve 55 and vents 36, 55a. Valve 55 is mounted above piston 60. Valve 55 is controlled by a plunger 57 which is slidably and sealingly disposed on a valve seat 56a (FIG. 3) within piston 60.

Distributor 11 includes a hydraulic cylinder 71 coaxially aligned at one end with a hydraulic cylinder 79 and at its opposite end with a pneumatic cylinder 78. Cylinder 71 has a bore 71a between its end walls 76, 77. Inside bore 71a is a double-acting piston 70 rigidly connected to coaxial push rods 74, 75 that are respectively slidably and sealingly mounted within center openings in end walls 76, 77.

Hydraulic cylinder 71 is operated by hydraulic unit 62 which includes a high-pressure source 62', 62" of hydraulic fluid 101, a low-pressure reservoir 63, and an electric, 4-way, slide valve 67. Piston 70 of cylinder 71 divides bore 71a into chambers 72, 73. Valve 67 connects chambers 72, 73 selectively to either source 62'-62" or to reservoir 63.

An electric control sequencer 46 programs the operation of valve 67 by sending an electric signal 65 through a line 67a, and also programs the operation of valve 50 by sending a signal 64 through a line 51.

Cylinder 78 has a bore 78a and an end wall 78b. Bore 78a has a vent 78c. A piston 80 is slidably and sealingly mounted inside bore 78a. A secondary reservoir chamber 35a is defined inside bore 78a between end wall 78b and piston 80. A conduit 41 interconnects chambers 35 and 35a.

The pneumatic unit 45c has a compressor 45 and a regulator 45a which is connected to chamber 35a through a conduit 45b controlled by a normally-closed valve 43 operated by a plunger 44.

Cylinder 79 has a bore 79a and an end wall 79b. Bore 79a has a vent 79c. A piston 81 is sealingly and slidably mounted in bore 79a. Piston 81 and wall 79b form therebetween the chamber 58'. Pistons 70, 80, 81 and rods 74, 75 form a unitary third shuttle 70a. The chamber 58 is formed between piston 61 and the top wall 68 of generator 10. Chambers 58 and 58' are interconnected by a conduit 58a. Chambers 58, 58' and conduit 58a contain a substantially constant volume of hydraulic fluid 102.

THE MAKE-READY OF APPARATUS 9

To initiate the operation of acoustic generator 10, valve 45a of pneumatic unit 45c is opened to allow high-pressure air 100 from compressor 45 to pressurize line 45b. Source 62', 62" is then activated to pressurize chamber 73 through valve 67, while chamber 72 remains connected to reservoir 63 through a line 72' and valve 67 (FIG. 1). As a result, shuttle 70a will move to the right (FIG. 4).

Figure 2:
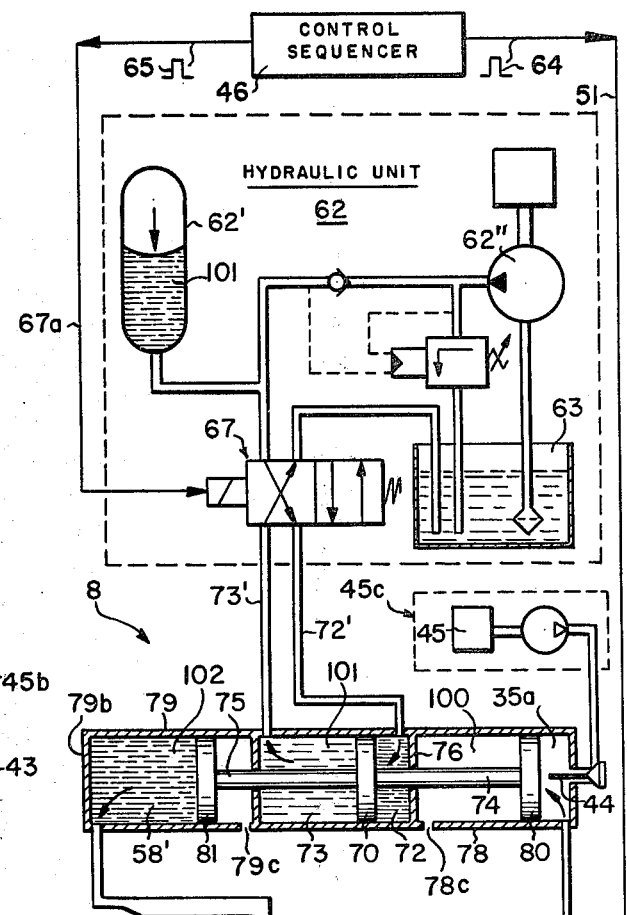
FIG. 2 shows the end of the forward stroke of the first shuttle, at which time the liquid jet is ejected at a very high velocity, and also shows the forward stroke of the second shuttle which is produced by the forward stroke of a third shuttle in a distributor.

Near the end of its stroke, piston 80 pushes against plunger 44 which lifts valve 43 from its seat 44a, thereby allowing high-pressure air 100 from line 45b to fill chambers 35a and 35. Piston 80 is stopped by end wall 78b. When chamber 35 becomes fully pressurized with air 100, shuttle 61a is pushed to its uppermost position, while shuttle 26 is pushed to its lowermost position (FIG. 2).

When valve 67 is energized by pulse 65, it shifts positions and allows source 62'-62" to supply high-pressure hydraulic fluid 101 through valve 67 and line 72' into chamber 72, while chamber 73 is connected through a line 73' and valve 67 to reservoir 63. The resulting hydraulic pressure in chamber 72 moves shuttle 70a to the left (FIG. 3). Hydraulic fluid 102 entrapped inside chamber 58' flows into and pressurizes chamber 58 of generator 10.

After shuttle 70a starts moving to the left, it disengages piston 80 from plunger 44. Valve 43 then closes line 45b, thereby sealing off chambers 35, 35a from compressor 45. At the same time, as the volume of chamber 35a increases, air will flow from chamber 35 to chamber 35a which reduces the air pressure in chamber 35.

The force exerted by the hydraulic fluid 102 in chamber 58 on the upper face of piston 61 is greater than the force exerted by the compressed air 100 in chamber 35 on the lower face of piston 61. As a result, shuttle 61a starts moving downwardly. As shuttle 61a approaches piston 20, plunger 57 (FIG. 2) is lifted by piston 20 from its seat 56a, thereby allowing air trapped in chamber 24 to vent through vents 36 and 55a. Shuttle 61a is stopped by and becomes hooked to piston 20.

When valve 67 is deenergized it reconnects chamber 73 to source 62'-62" through conduit 73', and it also reconnects chamber 72 to reservoir 63 through conduit 72'. As high-pressure hydraulic fluid 101 fills up chamber 73, it pushes shuttle 70a to its rightmost position (FIG. 4), while hydraulic fluid 102 trapped inside chamber 58 returns through line 58a to chamber 58'. As shuttle 70a shifts to the right, it causes the air 100 trapped in chamber 35a to recompress and to flow into chamber 35.

Because the diameter of bore 66a is larger than the diameter of bore 16, the hooked shuttles 26, 61a move upwardly until stopped by wall 68. The extent of this upward motion of the hooked shuttles can be controlled by deliberately entrapping a predetermined volume of hydraulic fluid 102 in chamber 58. Such entrapment can be accomplished by disconnecting chamber 58 from fluid communication with chamber 58' before main piston 61 reaches its uppermost position.

Thus, it is possible to selectively shorten the return strokes of hooked shuttles 26, 61a and to thereby also shorten the length of the forward stroke of shuttle 26 which produces the desired acoustic energy within the liquid body 12. It follows that by controlling the volume of the entrapped hydraulic fluid 102 within chamber 58, it is possible to vary the amplitude and the period of the acoustic impulses injected into the liquid body 12.

When piston 80 of shuttle 70a reaches its rightmost position, it lifts plunger 44 thereby admitting a sufficient volume of high-pressure air 100 into chambers 35a, 35 to compensate for the relatively small operational air losses.

Figure 5:
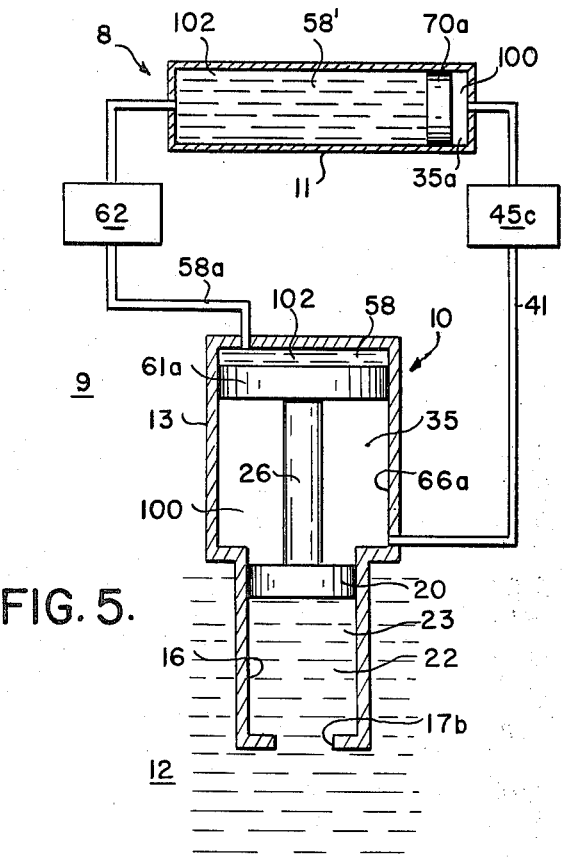
FIGS. 5-8 are schematic representations which facilitate the understanding of the broad aspects of the apparatus of this invention and its distinct modes of operation.

Apparatus 9 has now been made ready for its first cycle of operation, and its movable parts are in their positions, as shown in FIGS. 1 and 5.

One complete cycle of operation will now be described with reference to FIGS. 1–4 and to schematic FIGS. 5–8 in which the same numerals are used to designate the same or similar parts as in FIGS. 1–4.

THE FORWARD STROKE OF SHUTTLE 26

In FIGS. 1 and 5, generator 10 is shown ready to be "fired." When a trigger pulse 64 is transmitted by control sequencer 46 via line 51, valve 50 will open to fluidly interconnect chambers 31, 35. A downwardly-directed trigger force 52 becomes immediately exerted against the upper face of piston 27. Force 52 combines with the already existing downwardly-directed force 54 to produce a resultant downward force which is exerted on the portion of piston 20 directly facing port 18b. This resultant downward force overcomes the sum of all upwardly-directed forces, represented by arrow 53, which are exerted on shuttle 26.

Figure 6:
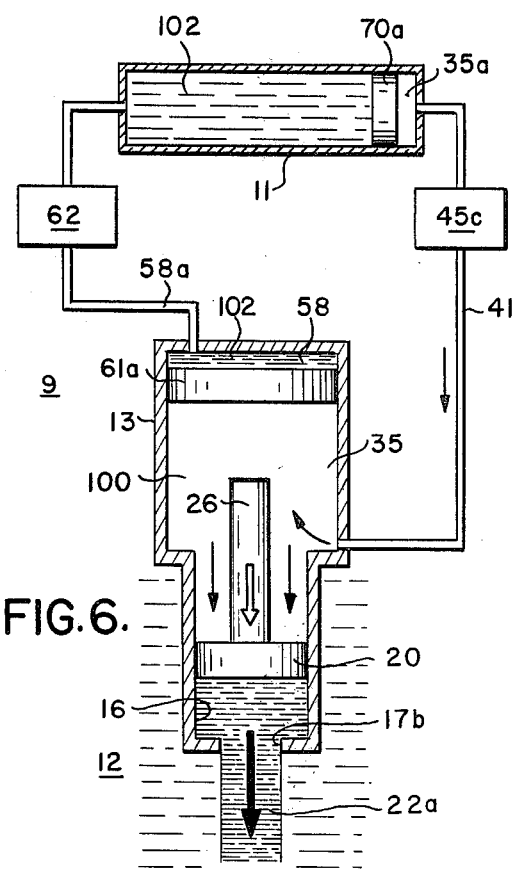

As a consequence, shuttle 26 starts moving downwardly (FIGS. 2, 6). It will be understood that when piston 20 becomes disengaged from its seat 18a, the high-pressure air 100 in chamber 35 becomes exerted against the entire surface 20b of piston 20, thereby causing shuttle 26 to become abruptly propelled downwardly to execute its forward stroke. Also, as shuttles 26 and 61 become unhooked, plunger 57 moves down, thereby closing its valve 55 and sealing chamber 24. Thereafter, high-pressure air from chamber 35 can no longer vent to the ambient.

THE FORWARD STROKE OF SHUTTLE 61a

When shuttle 26 completes its forward stroke (FIGS. 2, 6), a trigger pulse 65 is transmitted by control sequencer 46, thereby causing valve 67 to connect chamber 72 with source 62'-62" through line 72", and to connect chamber 73 with reservoir 63 through line 73'. As a result, shuttle 70a will execute its forward stroke to the left, thereby completely filling chamber 58 with high-pressure hydraulic fluid 102. The displacement of piston 80 allows plunger 44 to move to the left and to close valve 43 which seals off chambers 35a, 35 from compressor 45. The displacement of piston 80 also increases the volume of chamber 35a, thereby allowing air 100 to flow from chamber 35 to chamber 35a.

Figure 7:
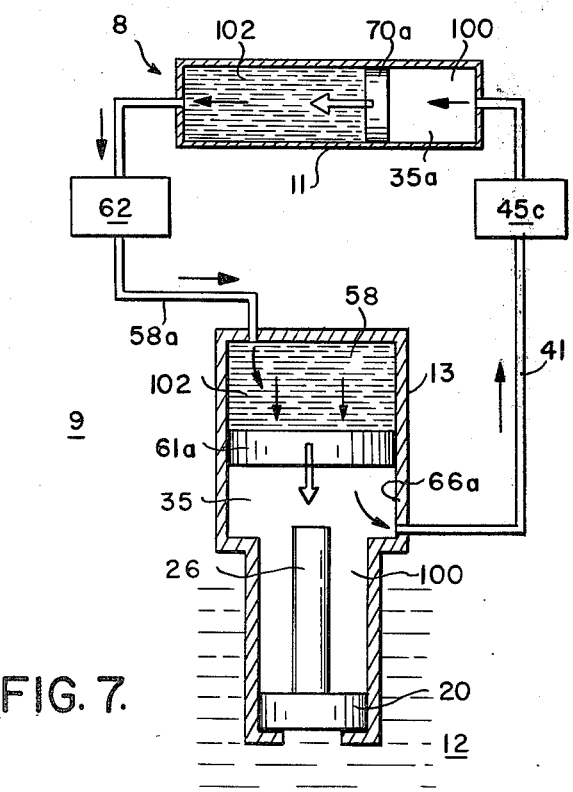
Figure 8:
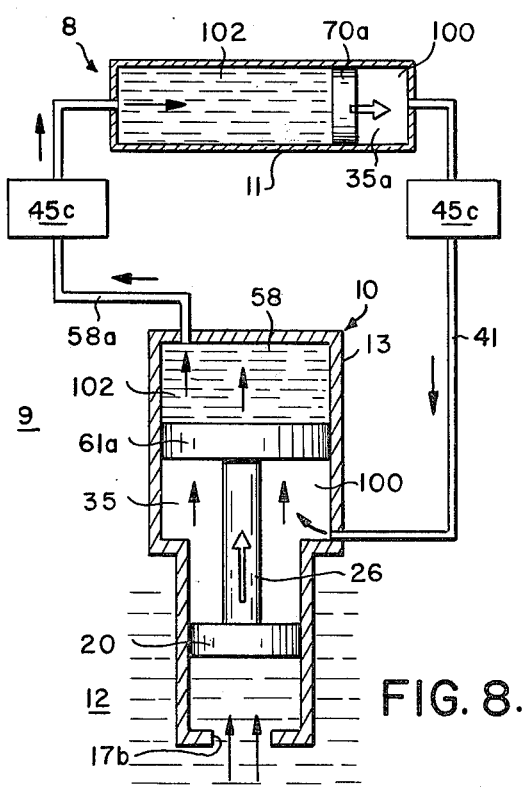

The hydraulic fluid 102 produces a downward resultant force on piston 61, causing shuttle 61a to execute its downward and forward stroke until piston 60 is stopped by piston 20. When piston 60 is near to piston 20, plunger 57 lifts from its seat 56a (FIG. 3), thereby allowing air 100 trapped in chamber 24 to vent through vents 36, 55a, which allows shuttle 61a to become hooked to shuttle 26 (FIGS. 3, 7).

THE RETURN STROKE OF SHUTTLES 26 AND 61a

When trigger pulse 65 is removed, valve 67 connects chamber 72 to reservoir 63, and chamber 73 to source 62'-62", thereby causing shuttle 70a to execute its return stroke to the right (FIGS. 4, 8). As a result, chamber 58 is depressurized and hydraulic fluid 102 trapped therein returns to chamber 58', while air 100 trapped in chamber 35a is expelled through conduit 41 into chamber 35.

The high-pressure air 100 in chamber 35 exerts an upward force on the hooked shuttles 26, 61a, thereby causing them to execute an upward return stroke until piston 61 is stopped by wall 68 or by hydraulic fluid 102 entrapped within chamber 58. This completes one full cycle of operation for shuttles 26, 61a.

Each time that shuttle 26 completes its forward stroke, the liquid slug 22 within slug chamber 23 becomes expelled at a very high velocity as a liquid jet 22a, which produces acoustic energy in the liquid body 12, as more fully explained in said U.S. Pat. No. 4,185,714.

TYPICAL OPERATING CONDITIONS

In the preferred embodiment of apparatus 9, the hydraulic fluid 101 is oil, while fluid 102 is water. The initial pressure of the air 100 in chamber 35 is 2,000 psi, and the initial pressure of the fluid 102 in chamber 58 is 15 psi (FIG. 1).

Valve 50 opens 8 ms after it is energized and causes chamber 31 to pressurize. At the end of the forward stroke of shuttle 26, the air pressure in chamber 35 drops to about 1,000 psi (FIG. 2).

At the end of the forward stroke of shuttle 61a (FIG. 3), the air pressure in chamber 35 is about 1,500 psi, while the fluid pressure in chamber 58 is about 2,200 psi.

Using water 102 instead of oil in chamber 58 avoids the risk of pollution from possible leaks in line 58a or from chamber 58. Furthermore, the lower viscosity of water compared to that of oil allows the use of a smaller-diameter conduit 58a, and the use of lower pressures in both the oil 101 and water 102.

During the return stroke of the hooked shuttles 26, 61a, at least a part of the energy stored in line 58a during the high-pressure phases of the operation (FIGS. 2, 3) is used to recompress the air from secondary chamber 35a into main chamber 35, thereby saving the remainder of the energy contained within conduit 58a.

Shifting the high-pressure air 100 back and forth between chambers 35a and 35 reduces the required increase in the air pressure during the forward stroke of shuttle 61a and allows the use of a lower pressure in the water 102. The substantial reduction in the utilized fluid pressures produces a corresponding reduction in the energy losses, and an overall increase in the efficiency of operation of apparatus 9.

Other advantages will become readily apparent to those skilled in the art.

What is claimed is:

1. In a liquid slug projector apparatus (9) including a generator (10) having a housing (13) defining a main port (17b) adapted to be submerged in a liquid body (12) for generating acoustic energy therein, and a first shuttle (26) forming with said main housing a slug chamber (23) for confining therein a liquid slug (22), the improvement comprising:
   a second shuttle (61a);
   said first and second shuttles being slidably mounted inside said housing; and
   cyclical force-producing means (8) operatively coupled with said shuttles to cause said shuttles during each cycle to move separately from each other and in locked condition with each other, whereby said first shuttle applies during each cycle an abrupt propulsion force to said confined liquid slug and expels said slug through said main port.

2. The apparatus of claim 1, wherein said force-producing means include:
   first means (100) adapted for locking and maintaining said shuttles in a rest position, for abruptly releasing said first shuttle from said second shuttle, and for propelling said first shuttle toward said bottom stop wall, thereby causing said expulsion of said liquid slug;
   second means (102) adapted for moving said second shuttle toward and locking it with said first shuttle; and
   said first means (100) returning said locked shuttles to said rest position.

3. The apparatus of claim 2, wherein:
   said housing has a top stop wall (68) which defines a top port (68'), and a bottom stop wall (17) which defines said main port (17b);
   said slug chamber is formed between said bottom stop wall and said first shuttle;
   a main reservoir chamber (35) is formed between said first shuttle and said second shuttle; and
   a main return chamber (58) is formed between said second shuttle and said top stop wall.

4. The apparatus of claim 3, wherein:
   said first means is a pressurized gas which fills said main reservoir chamber.

5. The apparatus of claim 4, wherein:
   said second means is a hydraulic fluid which fills said main return chamber, and
   third means (45c, 62, 70a) for cyclically pressurizing and depressurizing said hydraulic fluid (102) in said main return chamber, and said gas (100) in said main reservoir chamber.

6. The apparatus of claim 5, wherein:
   said third means comprises:
   a distributor (11) having a first (78), second (71), and third (79) co-axial cylinders, and
   a third shuttle (70a) having a first (80), second (70), and third (81) pistons, respectively slidably mounted in said first, second and third cylinders;
   said first cylinder forming a secondary reservoir chamber (35a) fluidly communicating with said main reservoir chamber, said main reservoir chamber and said secondary reservoir chamber containing a substantially constant amount of said gas (100);
   said third cylinder forming a secondary return chamber (58') fluidly communicating with said main return chamber, said main return chamber and said secondary return chamber containing a substantially-constant volume of said hydraulic fluid (102); and
   said third shuttle (70a) cyclically shifting said hydraulic fluid (102) between said secondary return chamber and said main return chamber, and cyclically shifting said gas (100) between said main reservoir chamber and said secondary reservoir chamber.

7. A liquid slug projector apparatus (9) comprising:
   a generator (10) having a housing (13) including a first bore (16) a bottom stop wall (17) defining a main port (17b), a second bore (66a), and a top stop wall (68) defining a top port (68');
   a first shuttle (26) having a first piston (20), a second piston (27), and a push rod (26a) interconnecting said first and second pistons;
   a second shuttle (61a) having a third piston (60), a fourth piston (61), and an interconnecting push rod (61b) defining a third bore (29) therein;
   said first piston being slidably mounted in said first bore, said second piston being slidably mounted in said third bore, said third piston being slidably mounted in said first bore, and said fourth piston being slidably mounted in said second bore;
   said second shuttle having a sleeve (15) slidably and sealingly extending from said fourth piston through said top port (68');
   said first bore defining a slug chamber (23) for containing a liquid slug (22) between said bottom stop wall and said first piston, and a vent chamber (24) between said first piston and said third piston;
   said second bore defining: a return chamber (58) between said fourth piston and said top stop wall, a trigger chamber (31) between said second and fourth pistons, and a main reservoir chamber (35) between said first and second shuttles;
   a pneumatic unit (45c) including a normally-closed valve (43) for coupling a pressurized gas (100) to said main reservoir chamber;
   a hydraulic fluid (102) in said main return chamber;
   a first, normally-closed, electrically-operated valve (50) coupling said reservoir chamber to said trigger chamber, said valve (50) when open causing said pressurized gas to abruptly propel said first shuttle to execute a forward stroke which expels said liquid slug;
   said hydraulic fluid (102) causing said second shuttle to move toward and lock to said first shuttle, thereby compressing said gas in said main reservoir chamber; and
   said hydraulic fluid (102) and said gas (100) causing said locked shuttles to return to said rest position.

8. The apparatus of claim 7, and a normally-closed valve (55) controlling the venting of said vent chamber, and said valve (55) being opened when said third piston becomes locked to said first piston.

9. The apparatus of claim 7 and further comprising:
   a distributor (11) defining a secondary return chamber (58'), a hydraulic chamber (71a), and a secondary reservoir chamber (35a);
   a fifth piston (81) slidably mounted in said secondary return chamber;

a sixth piston (70) slidably mounted in said hydraulic chamber, said sixth piston dividing said hydraulic chamber into a first hydraulic chamber (72) and a second hydraulic chamber (73);

a seventh piston (80) slidably mounted in said secondary reservoir chamber;

a hydraulic unit (62) comprising a hydraulic source (62', 62''), a second, electrically-operated, valve (67), and conduit means (72', 73') for interconnecting said first and second hydraulic chambers (72, 73) with said hydraulic source; and a control sequencer (46) for electrically controlling said first and second electrically-operated valves.

10. The apparatus of claim 5, wherein:
said hydraulic fluid (102) is water.

* * * * *